Sept. 22, 1970    E. R. MEINERS    3,529,412
CROP CHOPPER
Filed March 14, 1969    2 Sheets-Sheet 1
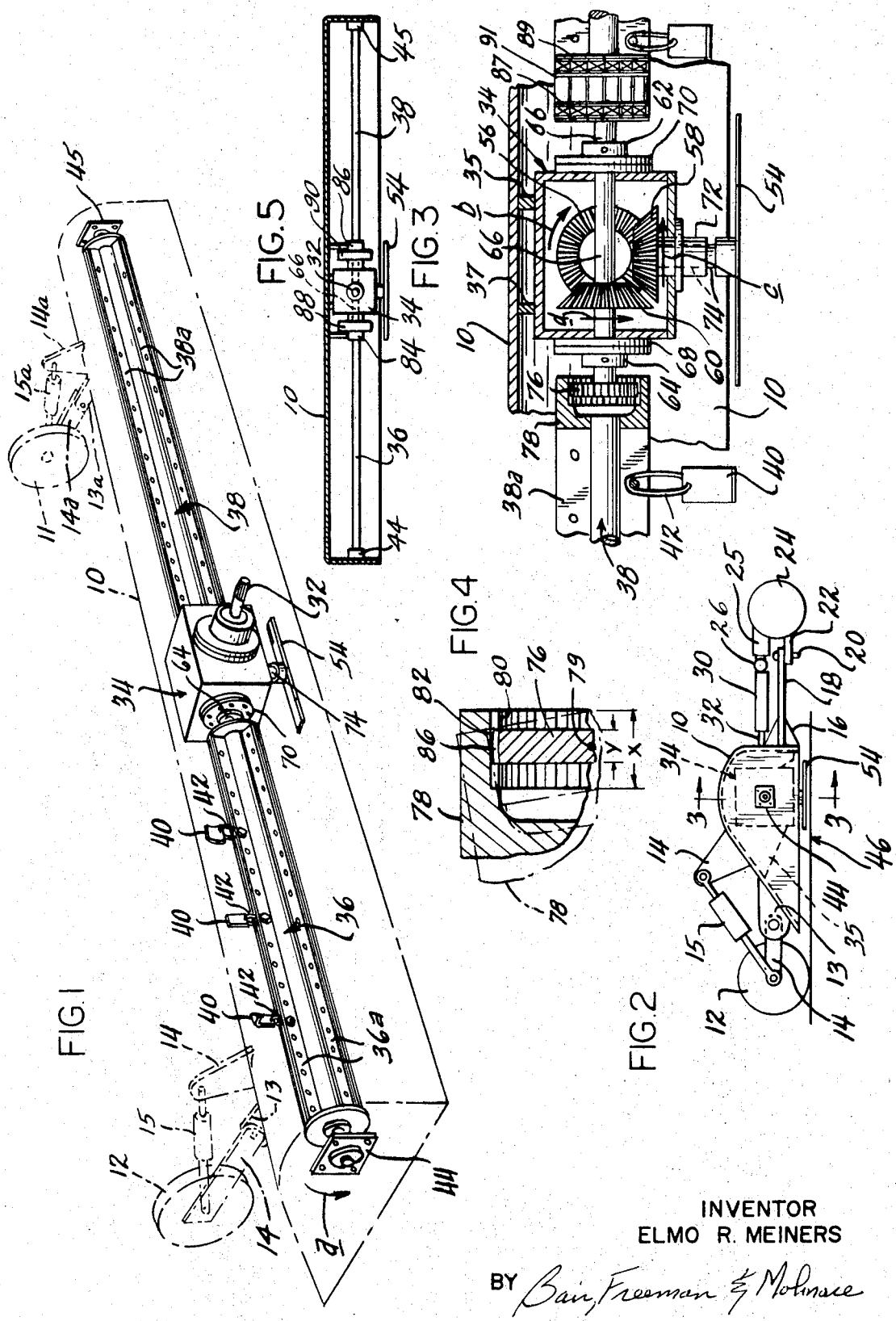
INVENTOR
ELMO R. MEINERS
BY Bair, Freeman & Molinare
ATTORNEYS.

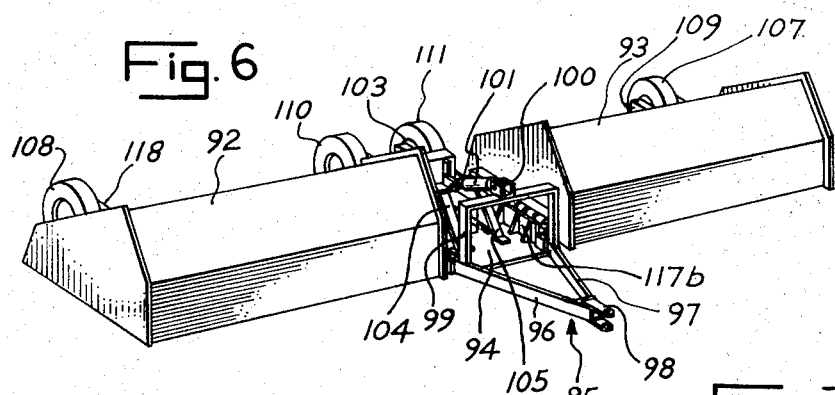
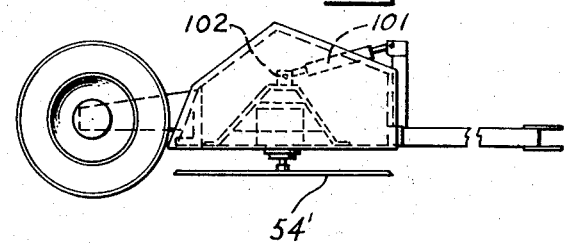
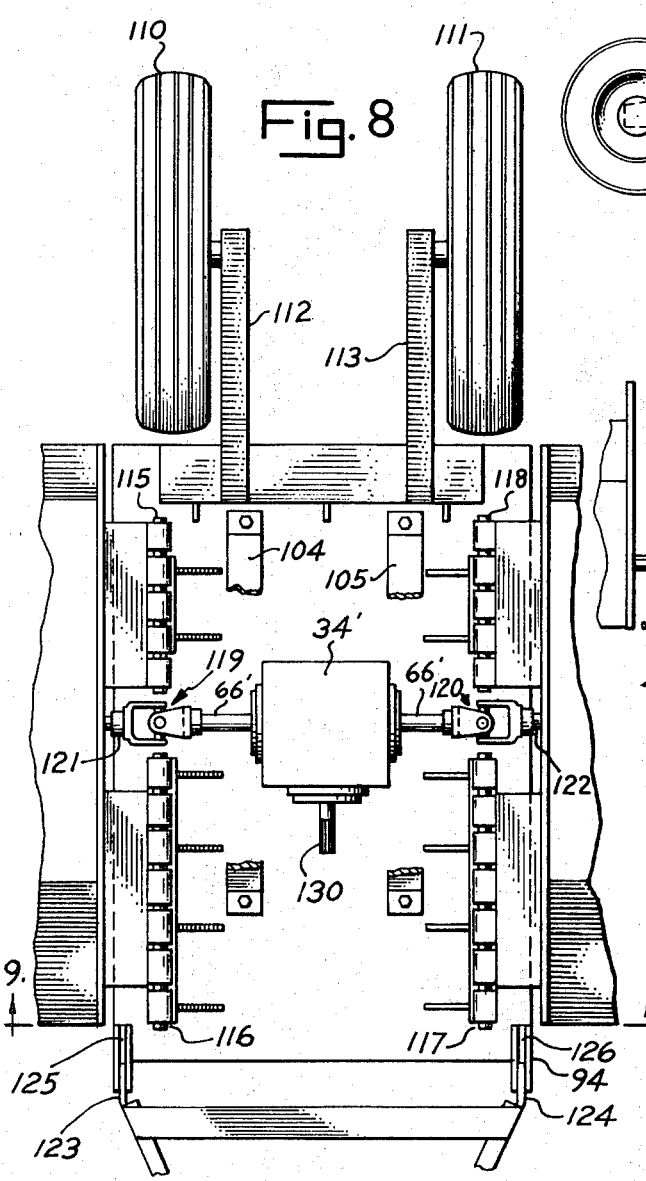
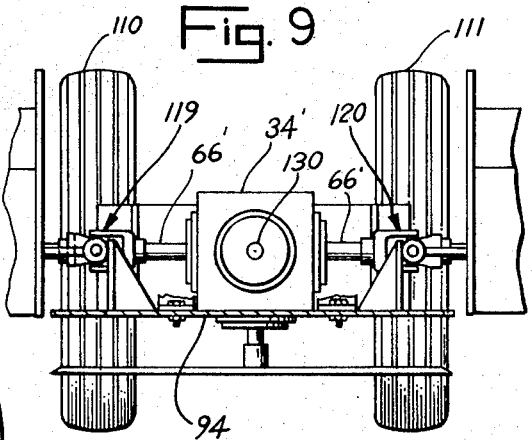

United States Patent Office 3,529,412
Patented Sept. 22, 1970

3,529,412
CROP CHOPPER
Elmo R. Meiners, Anchor, Ill.
(Rte. 47 S., Gibson City, Ill. 60936)
Continuation-in-part of application Ser. No. 666,572,
Sept. 11, 1967. This application Mar. 14, 1969,
Ser. No. 807,324
Int. Cl. A01d 49/00
U.S. Cl. 56—504                                    14 Claims

ABSTRACT OF THE DISCLOSURE

An improved crop chopper of the type having freely swinging, chopping blades attached to a rotatable reel to chop and mulch a field crop. The reel is driven by a direct gear drive. Flexible coupling means interconnect the reel to the drive and compensate for flexing or bowing of the rotatable reels. The present invention eliminates the problem in prior art chain or belt drive choppers of clogged or jammed driving means.

CROSS-REFERENCE TO RELATED APPLICATIONS

This is a continuation-in-part application of my co-pending application Ser. No. 666,572, now abandoned filed Sept. 11, 1967.

BACKGROUND OF THE INVENTION

This invention relates to an improved crop chopper and, more particularly, to the improvemment of a direct gear drive in a crop chopper.

To prepare the soil for tilling, it is often necessary to chop and mulch previous crop remnants such as corn stalks or the like. Preferably, this is accomplished by a crop chopper. A particular type of crop chopper used for this purpose is a wheeled farm implement which is pulled behind a tractor and driven by the power takeoff from the tractor. The power takeoff drives a pulley or chain drive belt which, in turn, causes a reel to rapidly rotate. Chopping blades are swingably attached to the reel and held in semi-rigid relation thereto by centrifugal force, and as the reel rotates, the blades chop and mulch the corn stalks, grass and the like.

Such a farm implement chops crops in a very adequate manner; however, the pulley or chain drive belt must often be replaced or unfouled. Waste material and debris is often thrown between the belts and the pulleys causing the belt to slip off of the pulleys. Thus, it is often necessary not only to replace the belt on the drive pulleys, but also to replace even the pulleys.

SUMMARY OF THE INVENTION

In a principal aspect, the present invention comprises an improved crop chopper which substantially eliminates the problems heretofore encountered. As a feature of the invention, the rotatable reel is driven directly by gears protected within a gear box. As another feature of the invention, a direct drive from a tractor through a gear box on the chopper to rotatable reels of the chopper is accomplished by a specially constructed, flexible coupling means.

An additional optional feature of the invention is flexible connecting means used to connect the gear box section to the support member supporting the rotatable reels.

As another optional feature of the invention, the rotatable reels are supported by separate hoods which allow the rotatable reels to adjust separately to the varying terrain of the earth.

One further optional feature of the invention is a rotary blade positioned to cut areas not covered by the reels. The rotary blade is driven directly by a shaft from the gear box.

It is thus an object of the present invention to provide an improved crop chopper. It is a further object of the present invention to provide an improved crop chopper with direct gear drive which substantially eliminates shut down time to repair or replace pulley or chain belt drives.

It is a further object of the present invention to provide an improved crop chopper with flexible connecting and coupling means.

It is a further object of the present invention to provide an improved crop chopper with rotatable reel members separately supported so that the reel members adjust separately to the varying terrain of the earth.

It is a further object of the present invention to provide a simplified and economical construction in a crop chopper.

These and other objects, advantages and features of the present invention will be more fully set forth in the detailed description which follows.

BRIEF DESCRIPTION OF THE DRAWINGS

In the detailed description which follows reference will be drawings comprised of the following figures:

FIG. 1 is a perspective view illustrating the improvement of the present invention as applied to typical crop chopper reels;

FIG. 2 is a side elevational view of my improved crop chopper;

FIG. 3 is a sectional view taken substantially along the line 3—3 in FIG. 2 illustrating the gear box and reel drive connecting gears;

FIG. 4 is an enlarged partial section of intermeshing gears utilized as flexible coupling means to drive the rotatable reel;

FIG. 5 is a partial cross-sectional view illustrating alternative flexible coupling means;

FIG. 6 is a perspective view illustrating a second embodiment of the present invention;

FIG. 7 is a side elevational view of the embodiment shown in FIG. 6;

FIG. 8 is a top view of the center portion of the embodiment illustrated in FIG. 6;

FIG. 9 is a front cross-sectional view taken substantially along the line 9—9 in FIG. 8.

DESCRIPTION OF THE PREFERRED EMBODIMENT

In FIG. 1 my improved crop chopper is shown enclosed in a protective metal cover or shroud 10 to prevent debris and dust from flying about. Wheels 11 and 12 are attached to the shroud 10 by brackets 13 and 13a, and arms 14 and 14a pivoted to the brackets. The wheels 11 or 12 may be raised or lowered to a desired height by hydraulic pistons 15 and 15a. The hydraulic pistons 15 and 15a are actuated by controls on the tractor (not shown) to raise and lower the crop chopper.

As illustrated in FIG. 2, gusset plates 16 secure a hitch bar 18 to the middle portion of the shroud 10. A pin 20 is inserted through the front end of the hitch bar 18 to attach the chopper to a tractor hitch 22. A tractor power takeoff 25 of a transmission housing 24 is interconnected through a universal joint 26 to a coupling shaft 30. The coupling shaft 30 slidably interconnects with power input shaft 32 of the chopper.

Attached on the interior middle portion of the shroud 10 is a gear box 34. Plates 35 and 37 are welded to hold the gear box 34 attached to the shroud 10 in a substantially immovable position. Power from the tractor is fed through the power input shaft 32 into the gear box 34 and then imparted to reels 36 and 38. This causes the reels 36 and 38 to rotate in the direction indicated by the arrow $a$ in FIG. 1. Chopping blades 40, which are swingably attached by links 42 to the reel 36, rotate with the reel 36. The blades 40 chop and mulch as they are rotated. Only three blades are shown on the reel 36 but there would be many on each of four radial flanges 36a of the reel, such as a maximum of one at each perforation in each flange, or a lesser number as desired or required. The flanges 38a of the reel 38 are similarly equipped with chopper blades 40, omitted from the drawing for simplification.

The reel 36 is mounted in position between the gear box 34 and a self-aligning bearing 44 attached to one end of the shroud 10. The reel 38 is similarly mounted in position between the gear box 34 and a self-aligning bearing 45. A rotary blade 54, similar to a mower blade, is disposed below the gear box 34. The blade 54 is rotatably driven in the horizontal plane when my crop chopper is in operative position with respect to the ground surface 46 as shown in FIG. 2.

FIG. 3 illustrates the construction of the gear box 34 and the gears and shafts interconnecting the reels 36 and 38 and the blade 54 with the power input shaft 32. A power input bevel gear 56 is driven in the direction of an arrow b and meshes with a rotary blade bevel gear 58 and a reel drive bevel gear 60 on a reel drive shaft 66. As the power input bevel gear rotates, it causes the other belevel gears 58 and 60 to rotate in the directions as indicated by arrows c and d. Stop collars 62 and 64 are attached to the reel drive shaft 66 and insure against undesirable end play of the reel drive shaft. Bearings 68 and 70 are provided for journalling the drive shaft 66 and are secured to the ends of the gear box 34. The bevel gear drive arrangement just described provides reliable results with economy and simplicity of construction.

The rotary mower blade 54 is attached to a vertical blade shaft 74 journalled in a bearing 72 which insures that the rotary blade bevel gear 58 and the blade drive shaft 74 will both be retained in a proper relation and that the bevel gears 56 and 58 will properly mesh. The rotary blade 54 cuts stalks and other material at the same level that the chopper blades 40 chop as the reels 36 and 38 are rotated.

The reel 38 is rotatably driven by the reel drive shaft 66 as is reel 36 (not shown in FIG. 3). Attached to the reel drive shaft 66 is a spur gear 76 which meshes with an internal gear 78 which, in turn, is attached to the reel 38 as shown in FIG. 3. The reel 38 is thereby driven by the shaft 66. The reel 36 is similarly driven.

FIG. 4 illustrates the relationship of the spur gear 76 and the internal gear 78. The width of the internal gear 78 denoted by the letter X is greater than the width of the spur gear 76 denoted by the letter Y. This permits the teeth of the spur gear to slide in relation to the teeth of the internal gear and still remain in meshing relationship. Such sliding will occur when the shroud 10 bows and the reels 36 and/or 38 thereupon flex in relation to each other and the gear box 34, as often happens when being operated.

The top land 80 of the internal gear 78 is planar as illustrated in FIG. 4; whereas the top land 82 of the spur gear 76 is convexly curved. Likewise the bottoms of the teeth of the internal gear 78 are planar and parallel to the lands 80, whereas, the bottoms of the teeth of the spur gear 76 are convexly curved to remain in parallel relation with the lands 82. Thus when the reel 38 flexes causing the internal gear 78 to be angularly displaced about a center 79 in relation to the spur gear 76 (as illustrated, greatly exaggerated, by dot-and-dash lines in FIG. 4), the teeth 84 of the internal gear 78 and the teeth 86 of the spur gear 76 will still properly mesh. This prevents the gears from binding and also prevents gear tooth breakage during operation of the chopper yet permits a satisfactory degree of flexure of the shroud 10.

An alternative embodiment is illustrated by FIG. 5. First and second reel support bearings 84 and 86 have been added to cooperate with self-aligning bearings 44 and 45 respectively. Thus reels 36 and 38 are supported in rotatable position at both ends. Flexible coupling means, which are schematically illustrated at 88 and 90, drivingly interconnect the reel drive shaft 66 with the reels 36 and 38.

Although there are many alternative constructions for the flexible connecting means 88 and 90, one which I have found advantageous utilizes first and second sprockets attached to the reel drive shaft 66 and a reel 36 and 38 respectively. The sprockets 87 and 89 respectively are then interconnected by a flexible double-row chain 91. The chain allows some flexure of the reels 36 or 38 while providing a direct drive from the reel drive shaft 66 to the reels 36 or 38.

FIG. 6 illustrates a second preferred embodiment of the improved crop chopper. This embodiment includes a center section 94 and two side hoods 92 and 93 which support rotatable reels (not shown).

The side hood 92 is supported by wheel 108 which transmits its support through a metal arm 118. The wheel 108 is rotatably attached to the metal arm 118, and the metal arm 118 is rigidly attached to the hood 92. The side hood 92 is further supported by the center section 94, to which the side hood 92 is flexibly attached. Hinges 115 and 116 provide this flexible attachment.

In like manner, side hood 93 is supported by wheel 107 and metal arm 109. The side hood 93 is further supported by center section 94 to which the side hood 93 is flexibly attached. Hinges 117 and 118 provide this flexible attachment.

The center section 94 houses a gear box 34', a rotary blade 54', and a fluid responsive cylinder 101. The center section 94 is supported from the rear by the wheels 110 and 111, and from the front by a three-point hitch 95.

The wheels 110 and 111 are rotatably attached to metal arms 112 and 113, respectively. The metal arms 112 and 113 are rigidly attached to the center section 94. The rotary blade 54' is mounted beneath the center section 94 and is drivingly attached to a power take-off member (not shown), located in the gear box 34' such as shown in FIG. 3.

The three-point hitch 95 is used to connect the crop chopper to a tractor (not shown). Strut members 96 and 97 of the three-point hitch are attached to the center section 94. Extended strut portions 123 and 124 are channeled in bracket pairs 125 and 126, respectively. Bracket pairs 125 and 126 are rigidly attached to the center plate 94. The three-point hitch then pivots on pins (not shown) inserted through the extended strut portions 123 and 124 and bracket pairs 125 and 126, respectively. A bracket 98 on the three-point hitch 95 mates with the trailer hitch (not shown) and a pin drops through the hitch bracket 98 and te trailer hitch (not shown).

The fluid responsive cylinder 101 is used to adjust the height of the crop chopper for chopping. One end of the piston 101 is connected to a metal bracket 100. The metal bracket 100 is rigidly fixed to the center of the horizontal section of a C-brace 99. The downwardly facing C-brace 99 is rigidly fixed to the separate ends of the hitch struts 96 and 97. The opposite arm of the piston 101 is connected to a similar metal bracket 102, more clearly shown in FIG. 7. The metal bracket 102 is held in fixed spatial relation to the center plate 94 by means of a horizontal cross bar 103 which is connected at both ends to the rigid metal bridges 104 and 105 respectively. The metal bridges 104 and 105 are rigidly bolted to the center section 94, as is shown in FIG. 8.

The crop chopper is raised or lowered by actuating the fluid responsive cylinder 101. In a raised position, the hitch struts 96 and 97, instead of being horizontal, would be inclined upwardly towards the rear of the crop chopper, and the center section 94 would be inclined downwardly towards the rear of the crop chopper. Thus, in a raised position the center section 94 and the strut members 96 and 97 form an inverted V as viewed from the side as in FIG. 7. Because the strut members 96 and 97 vary from the horizontal plane, the tractor hitch should be mounted to a tractor body in such a manner as to permit movement of the tractor hitch in a vertical plane.

Power for driving the improved crop chopper is transmitted from tractor drive shaft (not shown) to a power take-off 130 of the gear box 34'. Power is then transmitted to drive shaft member 66' and to the rotary blade 54' through gear means (in same fashion as previously described for the embodiment in FIGS. 1–5. Power from the drive shaft member 66' to the rotatable reel members 121 and 122 is transmitted through flexible coupling means 119 and 120, respectively.

As an additional feature of this embodiment, universal joints 119 and 120 provide this flexible coupling means. These universal joints 119 and 120 cooperate with separate hood members 92 and 93 and the hinges 115–118 to allow the rotatable reel members (not shown) to be displaced in a plane perpendicular to the line of chopper travel while rotating on an axis substantially parallel to that of the surface of the earth.

The second preferred embodiment of this invention has the advantage of greater flexibility, which permits the chopper to chop a crop more uniformly, even over hill crowns and gulleys. For example to chop a crop in a gulley, one reel of the chopper would run parallel to one side of the gulley, and the other reel of the chopper would run parallel to the other side of the gulley, with the rotary blade 54' cutting the center section. This added flexibility is provided by the hinges 115–118 which allow the separate supporting hoods 92 and 93 to be displaced in a plane perpendicular to the line of travel of the crop chopper. This additional flexibility is also provided by universal joints 119 and 120 which flex as do hinges 115–118 to allow the rotatable reel members (not shown) to be displaced and rotatably driven in a plane perpendicular to the line of chopper travel.

What is claimed is:

1. In a crop chopper field machine of the type having a plurality of chopping blades mounted on a rotatable reel member for chopping, shredding and mulching cornstalks and the like, the improvement comprising,
   direct driving means for rotatably driving said reel member, said driving means including a power take-off input means driven by a power means external said chopper
   at least one reel drive shaft member,
   gear means drivingly connecting said power take-off input means to said reel drive shaft member,
   a rotary blade mounted to rotate circularly in the horizontal plane when said chopper is in operative position, said blade being driven by said power take-off input means, said blade being positioned beneath said gear means for cutting a swath in a path not cut by said chopping blades, and
   flexible coupling torque transmission means drivingly connecting said reel drive shaft member to said reel member.

2. The improvement of claim 1 wherein said flexible coupling means comprise an internal gear meshing with a spur gear.

3. The improvement of claim 2 wherein said internal gear is axially attached to said reel drive shaft member and said spur gear is axially attached to said reel member, said internal gear having parallel teeth with flat planer top lands and said spur gear having parallel teeth with convexly curved top lands disposed to engage said internal gear teeth such that said spur gear teeth engage said internal gear teeth when said internal gear is angularly displaced relative to said spur gear, said internal gear having a greater width than said spur gear to allow said spur gear teeth to be slidably displaced relative to said internal gear teeth such that said internal gear teeth continually mesh with said spur gear teeth.

4. The improvement of claim 1 wherein said flexible coupling means comprise a first and a second sprocket attached to said reel member, said sprockets being flexibly interconnected by a double row chain simultaneously meshing with said first and second sprockets.

5. An improved crop chopper comprising, in combination, a cover member having a center portion and two side portions,
   a direct drive gear box attached to said center portion, said gear box having a drive shaft member extending therefrom toward each of said side portions,
   first and second rotatable chopping reel members, flexible coupling means for drivingly connecting said reel members to said drive shaft member, said first reel member being located in one of said side portions to rotate about an axis substantially perpendicular to the direction of chopper travel, and parallel to the surface of the earth when said chopper is in operative position, said second reel member being located in the other one of said side portions to rotate about said axis,
   a rotary blade shaft projecting beneath said gear box,
   a rotary blade mounted on said blade shaft, said blade shaft extending into said gear box, said blade being used to cut beneath said gear box when said chopper is in operative position,
   means for driving said drive shaft member, said means being connected to power input means, and
   means for connecting said chopper to tractor pulling means.

6. The chopper of claim 5 wherein said flexible coupling means coupling each reel member to said shaft member comprise a first sprocket attached to said reel member and a second sprocket attached to said shaft member, said sprockets being flexibly interconnected by a double row chain simultaneously meshing with said first and second sprockets.

7. The chopper of claim 5 wherein said flexible coupling means include first and second annular gear means, and first and second spur gear means, said first annular gear means meshing with said first spur gear means and acting to drivingly interconnect said shaft member with one of said reel members, and said second annular gear means meshing with said second spur gear means and acting to drivingly interconnect said shaft member with the other of said reel members.

8. The chopper of claim 7 wherein said annular gear means have straight planar bottoms of teeth and straight planar teeth lands, and said spur gear means have convexly shaped bottoms of teeth and parallel convexly shaped teeth lands, and said spur gear means being narrower than said intermeshing annular gear means to permit movement of said spur gear means in said meshed annular gear means with continuous meshing of said gear means.

9. An improved crop chopper, comprising, in combination,
   a center portion,
   a first side portion having a first reel member located in said first side portion to rotate about an axis substantially perpendicular to the line of chopper travel substantially parallel to the surface of the earth beneath said first reel member, and having a first reel supporting means for said first reel member,
   a second side portion having a second reel member located in said second side portion to rotate about an axis substantially perpendicular to the line of chopper travel and substantially parallel to the surface of the earth beneath said second chopper member, and having a second reel member supporting means for said second reel member,
   flexible connecting means connecting said center portion to said first and said second side portions,
   a direct drive gear box mounted on said center portion, said gear box having a drive shaft member extending towards said first and said second side portions, and rotary blade means for rotating circularly in a substantially horizontal plane when said chopper is in an operative position, said blade means being drivably mounted beneath said gear box for cutting a swath in a path not cut by said first and second reel members, means for transmitting power from said drive shaft member to said first and second reel members, and means for hitching said chopper pulling means.

10. The apparatus of claim 9 wherein said flexible connecting means comprise a first and a second hinge means flexibly connecting said center portion to said first and said second side portions respectively such that said first and said second side portions may be displaced in a plane perpendicular to the line of travel.

11. The apparatus of claim 9 wherein said means for transmitting power includes flexible coupling means.

12. The apparatus of claim 11 wherein said flexible coupling means coupling said shaft member to said first and second reel members comprise first and second universal joints respectively.

13. The apparatus of claim 9 wherein said first and said second reel supporting means comprise a first and a second hood, separately attached to said center portion such that said first and second reel members follow in planes substantially parallel to the earth beneath said first and said second hood respectively.

14. The apparatus of claim 13 wherein said first and said second hoods are separately supported by a first and a second wheel respectively, said first and second wheels being attached to said first and second hoods respectively, to cooperate with said flexible connecting means in allowing said first and second reel members to follow in planes substantially parallel to the earth beneath said first and second hoods respectively.

References Cited

UNITED STATES PATENTS

| | | |
|---|---|---|
| 2,279,652 | 4/1942 | Beard. |
| 3,049,851 | 8/1962 | Hargreaves et al. _____56—7 |
| 3,232,075 | 2/1966 | Wildhaber _____ 64—9 |
| 3,400,521 | 9/1968 | Caldwell _____ 56—6 |

FOREIGN PATENTS 172,551  10/1916  Canada.

LOUIS G. MANCENE, Primary Examiner

J. A. OLIFF, Assistant Examiner